United States Patent Office 2,701,209
Patented Feb. 1, 1955

2,701,209

PLASTIC LIME OF ENHANCED HODDABILITY

Harry N. Huntzicker, Evanston, Ill., assignor to United States Gypsum Company, Chicago, Ill., a corporation of Illinois No Drawing. Application March 17, 1951,
Serial No. 216,265

14 Claims. (Cl. 106—120)

The present invention relates to improvements in hydrated lime which is characterized by improved hoddability.

Ordinarily when lime is hydrated, particularly in a pressure hydrator, both the calcium oxide as well as any magnesium oxide therein contained will become converted into the corresponding hydroxide or as it is usually called "hydrate."

While pressure hydrated limes, either high calcium or dolomitic, can be rendered more plastic by the expedient of ball milling them, for example as set forth in Patent No. 2,408,647 of Huntzicker and Norman, it has now been found that a greater improvement in the hoddability of such plastic limes may be obtained by conducting the pressure hydration in the presence of a siliceous material which has not previously been reacted with lime or magnesia, particularly lime in the presence of moisture. Thus it was found that if a calcined lime, that is to say the oxide, was treated in a pressure hydrator so as to become hydrated under superatmospheric pressure in the presence of a siliceous material, the resulting product would be characterized by a greater degree of hoddability. Hoddability may be defined as that property of lime which allows it to be heaped up in a plasterer's hod without slumping or slopping, a very desirable property.

When a lime, particularly a dolomitic lime, has been pressure hydrated and the plasticity improved by tube milling, it has been invariably found that the ordinary soaking procedure cannot be used. When normal pressure hydrated tube milled lime is soaked it will not gel like ordinary non-pressure hydrated dolomitic lime or even non-tube-milled pressure hydrated lime to form a hoddable putty. It does not soak uniformly, instead the top portion is cheesy and stiff in appearance, the center is normal and the bottom is very thin and watery. It seems that imparting plasticity to the lime by tube milling gives rise to these problems. Thus it is possible to have a very plastic lime but one characterized by poor soaking and poor hodding properties. It has been discovered that the addition of the siliceous or aluminous material to the lime before or during hydration overcomes these disadvantages, yielding an ideal lime, i. e. one which has excellent working as well as good soaking and holding properties. It now can be soaked like ordinary lime, resulting in a uniform and hoddable putty. There never has been available a plastic pressure hydrated lime which also has uniform soaking and hodding properties. This is the major reason why pressure hydrates have not completely replaced normal dolomitic hydrates. Because of the traditionally bad soaking and poor hodding properties, pressure hydrated limes are still slightly less than one half of the total finishing lime market; normal hydrates are still preferred by the other half of the market because of their good soaking and hodding properties.

In accordance with the present invention, however, pressure hydrated limes can be produced with all of the most desirable properties.

A preferred material for the carrying out of the present invention is diatomaceous earth, although it has been found that other materials, such as finely ground siliceous slag, ground cullet (glass), natural and synthetic zeolites, may also be used. It is even possible to use sand, provided that it is extremely finely ground. Clay has also been found useful, particularly the type which is high in silica. If diatomaceous earth is used, it is preferred to employ that which has a particle size of from between 1 to 10 microns. It has also been found that Portland cement, particularly white Portland cement, may be substituted for the diatomaceous earth; in fact, even very finely ground asbestos will give useful results. Particularly useful is a form of colloidal silica, for instance of that type which can be obtained on the market under the trade designation of "Santocel" as made by the Monsanto Chemical Company. The amount of added material may vary upwardly from about ¼% in the case of the colloidal silica or about 1% for ordinary siliceous material, the maximum being approximately 15% above which no further useful improvements will be effected.

In carrying out the present process the modifying material may be added to the lime any time after its calcination, but it must be added before the pressure hydration, or at least during the pressure hydration, so that the hydration of the lime, that is to say, its conversion from the oxide to the hydroxide, will be carried out while the material is in admixture with the added modifying material. Pressure hydration is, of course, a very well known process, and hence requires no description other than to say that it involves placing the calcined lime into a closed vessel to which there is supplied sufficient water to effect the hydration. The heat generated by the hydration is usually sufficient to generate the desired pressure, although it is within the contemplation of the inventor to employ actual steam, which may be introduced into the hydrator. In any event, the hydration is effected under more than superatmospheric pressure. As an example of the hydration of lime by means of pressure, reference is directed to the expired patent to Charles Warner and Irving Warner, No. 1,284,505, dated November 12, 1918.

The characteristics of the lime formed as a result of the process of the present invention is that it will form a gel within a few hours after soaking and that, if allowed to stand overnight, there will be produced a lime putty of good hoddability and uniformity.

In the commercial practice of the present invention calcined lime may be mixed with say from 1% to 5% of diatomaceous earth and the mixture then fed to a hydrator, for example in the maner described in the above mentioned patent, the lime finally being dried and, if desired, ball milled, for example as disclosed in the Huntzicker and Norman Patent No. 2,408,647, still further to increase its immediate plasticity, that is to say, to develop a product in which the plasticity develops within a short time after gauging with water.

It is particularly advantageous to add the modifying material between the first hydration at atmospheric pressure and the hydration under pressure. Thus the calcined lime (quicklime) may be hydrated in a Schaffer hydrator, which will hydrate the calcium oxide, then be admixed with the modifying material, whereafter the hydration is completed under superatmospheric pressure in a pressure hydrator, as described in the said Huntzicker and Norman patent.

While in the detailed example diatomaceous earth has been described, it is also possible to use any of the other equivalent materials. A number of these have been tried out, with the results given in the subjoined table, in which the hoddability is expressed in the last column by an arbitrary numerical designation on the scale of which the best hoddability is expressed as the lowest number, 1, while the lesser and worst hoddability is expressed by increasingly higher numbers, terminating in 10. There is no standard test for determining the hoddability of a lime putty. Therefore a type of gel test was necessarily devised. The modified Vicat apparatus with a 30 gram, 12½ millimeter diameter needle as shown and described in A. S. T. M. designation C110–49 for Standard Consistency of Lime Putty was used. Standard one gallon cans were provided with closable openings at the middle and at the bottom of the side of each can, allowing samples to be taken from the top, middle, and bottom without disturbing the rest of the soaked lime putty. Each sample was tested separately for penetration with the described Vicat needle both before and after stirring. Each lime putty soak was made in a manner to simulate actual job soaking conditions; the required amount of water was placed in each can and the lime dumped on top of the water, without agitation or mixing, and left to soak for 16 hours before testing. As the hoddability is a function of the gel strength of the lime putty, the thixotropic nature of the samples withdrawn would be a good indication of such strength. Thus if a sample would yield a penetration of zero to 3 millimeters before stirring and a penetration of 20 to 30 millimeters after stirring, a good gel strength would be indicated. To yield a good hoddability rating, expressed by a low number, all three samples, top, middle and bottom, should be uniform and possess high gel strengths similar to the example cited above. Generally speaking, the more plastic a lime, the poorer was its hoddability, so that when the plasticity as well as the hoddability are both good, the best results are obtained. Hence, in the subjoined table it will be noticed that with the example in which no additive was used there was a plasticity of from 230 to 280 (Emley scale) and yet the hoddability was 7 to 10 (quite poor). In other words, a good lime must not only have a plasticity in excess of at least 200 to be considered a plastic finishing lime, but it must also have a good (i. e. low number) hoddability. The effects of the various added materials are hence evident from the table, which is as follows:

*Effect of added materials upon the relative hoddability of ball-milled pressure-hydrated dolomitic lime hydrates*

| Material Added | Amount (percent by wt.) | Plasticity (Emley) | Hoddability |
|---|---|---|---|
| Dicalite SA3 (diatomaceous earth) | 1 | 206 | 2 |
| Do | ½ | 207 | 1 |
| Do | ¾ | 308 | 3 |
| Clay (65% $SiO_2$) (Paris white-top) | 1 | 261 | 2 |
| Attasol Clay (55–60% $SiO_2$) | 1 | 245 | 2 |
| Tripoli from Seneca, Mo | 1 | 270 | 3 |
| Greensand (a zeolite) | 1 | 300 | 3 |
| Bentonite (40% $SiO_2$) | 1 | 284 | 4 |
| Cullet (glass) | 1 | 295 | 2 |
| Chrysotile asbestos, fine | 1 | 280 | 2 |
| Pyrophillite | 1 | 280 | 3 |
| Ground common brick | 1 | 200 | 2 |
| "Electrophos slag" (high silica) | 1 | 230 | 2 |
| None | 0 | 230–280 | 7–10 |

The other types of siliceous materials may be employed in the same manner, and any suitable substance known to be their equivalent may be used without departing from the essential principles of the present invention.

I claim:

1. Process of producing a hydrated lime of enhanced hoddability which comprises hydrating dolomitic quicklime under superatmospheric pressure by means of sufficient water to convert substantially all of the calcium oxide of said quicklime and a considerable portion of the magnesium oxide thereof into their respective hydrates, while in admixture with from about 0.25% to about 15% by weight of a siliceous material capable of reacting with the calcium and magnesium oxide components of the dolomitic quicklime.

2. Process of producing a hydrated lime of enhanced hoddability which comprises hydrating dolomitic quicklime under superatmospheric pressure by means of sufficient water to convert substantially all of the calcium oxide of said quicklime and a considerable portion of the magnesium oxide thereof into their respective hydrates, while in admixture with from about 0.25% to about 15% by weight of diatomaceous earth.

3. Process of producing a hydrated lime of enhanced hoddability which comprises hydrating dolomitic quicklime under superatmospheric pressure by means of sufficient water to convert substantially all of the calcium oxide of said quicklime and a considerable portion of the magnesium oxide thereof into their respective hydrates, while in admixture with from about 0.25% to about 15% by weight of high-silica clay.

4. Process of producing a hydrated lime of enhanced hoddability which comprises hydrating dolomitic quicklime under superatmospheric pressure by means of sufficient water to convert substantially all of the calcium oxide of said quicklime and a considerable portion of the magnesium oxide thereof into their respective hydrates, while in admixture with from about 0.25% to about 15% by weight of finely ground siliceous slag.

5. Process of producing a hydrated lime of enhanced hoddability which comprises hydrating dolomitic quicklime under superatmospheric pressure by means of sufficient water to convert substantially all of the calcium oxide of said quicklime and a considerable portion of the magnesium oxide thereof into their respective hydrates, while in admixture with from about 0.25% to about 15% by weight of Portland cement.

6. Process of producing a hydrated lime of enhanced hoddability which comprises hydrating dolomitic quicklime under superatmospheric pressure by means of sufficient water to convert substantially all of the calcium oxide of said quicklime and a considerable portion of the magnesium oxide thereof into their respective hydrates, while in admixture with from about 0.25% to about 15% by weight of finely ground glass.

7. A hydrated lime of enhanced hoddability which comprises the product resulting from the process of claim 1.

8. A hydrated lime of enhanced hoddability which comprises the product resulting from the process of claim 2.

9. A hydrated lime of enhanced hoddability which comprises the product resulting from the process of claim 3.

10. A hydrated lime of enhanced hoddability which comprises the product resulting from the process of claim 4.

11. A hydrated lime of enhanced hoddability which comprises the product resulting from the process of claim 5.

12. A hydrated lime of enhanced hoddability which comprises the product resulting from the process of claim 6.

13. Plastic hydrated dolomitic lime resulting from normal atmospheric hydration of calcined dolomitic lime and the pressure hydration of the resulting product by means of sufficient water to convert substantially all of the calcium oxide of said quicklime and a considerable portion of the magnesium oxide thereof into their respective hydrates, while in admixture with from about 0.25% to about 15% of a siliceous material.

14. Process of producing a plastic finishing lime of high hoddability which comprises hydrating a calcined lime containing magnesium oxide with sufficient water at atmospheric pressure to hydrate the calcium oxide content thereof, adding from about 0.25% to about 15% of a siliceous material capable of reacting with the calcium and magnesium oxide components of said lime, and then hydrating the resulting product under superatmospheric pressure.

References Cited in the file of this patent

UNITED STATES PATENTS

| | | |
|---|---|---|
| 1,249,997 | Olson | Dec. 11, 1917 |
| 1,284,505 | Warner et al. | Nov. 12, 1918 |